United States Patent
Li et al.

(10) Patent No.: US 8,567,499 B2
(45) Date of Patent: Oct. 29, 2013

(54) GELLED LIQUID HYDROCARBON TREATMENT FLUIDS AND THEIR ASSOCIATED METHODS OF USE

(75) Inventors: Leiming Li, Sugar Land, TX (US); Lijun Lin, Sugar Land, TX (US); Syed A. Ali, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 377 days.

(21) Appl. No.: 12/830,512

(22) Filed: Jul. 6, 2010

(65) Prior Publication Data

US 2011/0030953 A1    Feb. 10, 2011

Related U.S. Application Data

(60) Provisional application No. 61/231,046, filed on Aug. 4, 2009.

(51) Int. Cl.
  *E21B 43/22*    (2006.01)
(52) U.S. Cl.
  USPC ........ 166/279; 166/300; 166/292; 166/280.2; 166/312; 166/276; 166/278
(58) Field of Classification Search
  USPC ............. 166/305.1, 308.1, 308.2, 308.4, 279, 166/300, 292, 280.2, 312, 276, 278
  See application file for complete search history.

(56) References Cited

U.S. PATENT DOCUMENTS

| | | |
|---|---|---|
| 3,505,374 A | 4/1970 | Monroe |
| 4,174,283 A | 11/1979 | Griffin, Jr. |
| 4,200,539 A | 4/1980 | Burnham et al. |
| 4,200,540 A | 4/1980 | Burnham |
| 4,316,810 A | 2/1982 | Burnham |
| 4,432,882 A | 2/1984 | Raynolds et al. |
| 4,622,155 A | 11/1986 | Harris et al. |
| 5,417,287 A | 5/1995 | Smith et al. |
| 5,551,516 A | 9/1996 | Norman et al. |
| 5,807,812 A | 9/1998 | Smith et al. |
| 5,846,915 A | 12/1998 | Smith et al. |
| 5,964,295 A | 10/1999 | Brown et al. |
| 5,979,555 A | 11/1999 | Gadberry et al. |
| 5,979,557 A | 11/1999 | Card et al. |
| 6,140,277 A | 10/2000 | Tibbles et al. |
| 6,258,859 B1 | 7/2001 | Dahayanake et al. |
| 6,509,301 B1 | 1/2003 | Vollmer |
| 7,066,262 B2 | 6/2006 | Funkhouser |
| 2006/0037754 A1* | 2/2006 | Funkhouser ............... 166/308.1 |
| 2008/0070806 A1* | 3/2008 | Lin et al. ...................... 507/110 |
| 2008/0173452 A1* | 7/2008 | Sanders et al. ............. 166/308.2 |

* cited by examiner

Primary Examiner — Zakiya W Bates
Assistant Examiner — Silvana Runyan
(74) Attorney, Agent, or Firm — Matthieu Vandermolen; Daryl R. Wright; Tim Curington

(57) ABSTRACT

A method of forming a gelled liquid hydrocarbon treatment fluid is disclosed. The method comprises combining a liquid hydrocarbon, a phosphoric acid ester and a pre-mixed solution comprising water, ferrous ion ($Fe^{2+}$) and an amine; and forming the gelled liquid hydrocarbon treatment fluid. A method of treating a portion of a subterranean formation is also disclosed and comprises: providing a gelled liquid hydrocarbon treatment fluid, by combining a liquid hydrocarbon, a phosphoric acid ester and a pre-mixed solution comprising water, ferrous ion and an amine, and treating the portion of the subterranean formation with the gelled liquid hydrocarbon treatment fluid.

14 Claims, 2 Drawing Sheets

GELLED LIQUID HYDROCARBON TREATMENT FLUIDS AND THEIR ASSOCIATED METHODS OF USE

CROSS-REFERENCE TO RELATED APPLICATIONS

This application claims the benefit of U.S. Provisional Application No. 61/231,046, filed Aug. 4, 2009, which is incorporated herein by reference in its entirety.

FIELD OF THE INVENTION

This invention relates generally to composition and method for treating a well penetrating a subterranean formation. More specifically, the invention relates to gelled liquid hydrocarbon treatment fluids and associated methods of use.

BACKGROUND

Some statements may merely provide background information related to the present disclosure and may not constitute prior art.

Gelled liquid hydrocarbon fluids have been utilized in treating subterranean formations penetrated by well bores, e.g., for stimulation or sand control treatments such as fracturing or gravel packing, respectively. In fracturing treatments, a gelled liquid hydrocarbon fracturing fluid that may comprise particulates, often referred to as proppant, suspended therein is pumped through a well bore into a subterranean formation at a rate and pressure such that one or more fractures are formed or enhanced in a portion of the formation. Proppant particulates may be deposited in the fractures, inter alia, to prevent the formed fractures from closing, thereby maintaining conductive channels through which produced fluids can flow to the well bore. At a desired time, the viscosity of the gelled liquid hydrocarbon fluid may be reduced or "broken" and the fluid may be recovered.

Similarly, sand control operations, such as gravel packing, use gelled liquid hydrocarbon fluids, often referred to as gravel pack fluids. Gravel pack fluids usually are used to suspend gravel particulates for delivery to a desired area in a well bore, e.g., near unconsolidated or weakly consolidated formation particulates, to form a gravel pack to enhance sand control. One common type of gravel packing operation involves placing a gravel pack screen in the well bore and packing the annulus between the screen and the well bore with gravel of a specific size designed to prevent the passage of formation sand. The gravel, inter alia, acts to prevent the particulates from occluding the screen or migrating with the produced fluids, and the screen, inter alia, acts to prevent the gravel from entering the production tubing. Once the gravel pack is substantially in place, the viscosity of the gravel pack fluid often is reduced to allow it to be recovered or produced back from the well bore.

Polyvalent metal salts of orthophosphoric acid esters have been utilized as gelling agents for forming high-viscosity gelled liquid hydrocarbon treatment fluids. Such gelled liquid hydrocarbon treatment fluids often have included particulate materials such as proppant or gravel, and oftentimes delayed breakers for causing the treatment fluids to break into relatively thin fluids so that the treatment fluids may be produced back. Good descriptions of these processes, specifically utilizing aluminum (Al3+) salts of the orthophosphate esters, may be found in the following patents: Griffin U.S. Pat. No. 4,174,283, Burnham and Tiner U.S. Pat. No. 4,200,539, Burnham U.S. Pat. No. 4,200,540, Burnham U.S. Pat. No. 4,316,810, and Harris, Hottmeyer and Pauls U.S. Pat. No. 4,622,155. Fracturing processes utilizing iron compounds in combination with similar orthophosphate esters are described by Monroe in U.S. Pat. No. 3,505,374, by Smith and Persinski in U.S. Pat. No. 5,417,287 and by Smith et al. in U.S. Pat. No. 5,846,915. All of these patents being herewith incorporated by reference. The gelled liquid hydrocarbon fracturing fluids described in the above patents utilize ferric iron (Fe3+) or aluminum polyvalent metal salts of phosphoric acid esters as gelling agents and delayed breakers such as hard burned magnesium oxide which is slowly soluble in water.

While the heretofore utilized high viscosity gelled liquid hydrocarbon fracturing fluids and methods have been used successfully for forming fractures in subterranean formations, sometimes problems have been encountered as a result of the use of the gelling agent, i.e., the ferric iron salt of a phosphoric acid ester.

Thus, there are needs for improved methods of using and preparing gelled liquid hydrocarbons, improved liquid hydrocarbon gelling agents, and improved gelled liquid hydrocarbon compositions.

SUMMARY

In a first aspect a method of forming a gelled liquid hydrocarbon treatment fluid is disclosed. The method comprises combining a liquid hydrocarbon, a phosphoric acid ester and a pre-mixed solution comprising water, ferrous ion compound and an amine; and forming the gelled liquid hydrocarbon treatment fluid. In a second aspect a method of treating a portion of a subterranean formation is disclosed. The method comprises providing a gelled liquid hydrocarbon treatment fluid, by combining a liquid hydrocarbon, a phosphoric acid ester and a pre-mixed solution comprising water, ferrous ion ($Fe^{2+}$) compound and an amine, and treating the portion of the subterranean formation with the gelled liquid hydrocarbon treatment fluid.

According to one embodiment, the ferrous ion ($Fe^{2+}$) compound is a ferrous salt.

In a further embodiment, the gelled liquid hydrocarbon treatment fluid has a concentration of more than about 100 mg/liter of alkyl phosphate esters that have a molecular weight of less than about 350, or even a concentration of more than about 250 mg/liter of alkyl phosphate esters that have a molecular weight of less than about 350.

DETAILED DESCRIPTION

Figure 1:
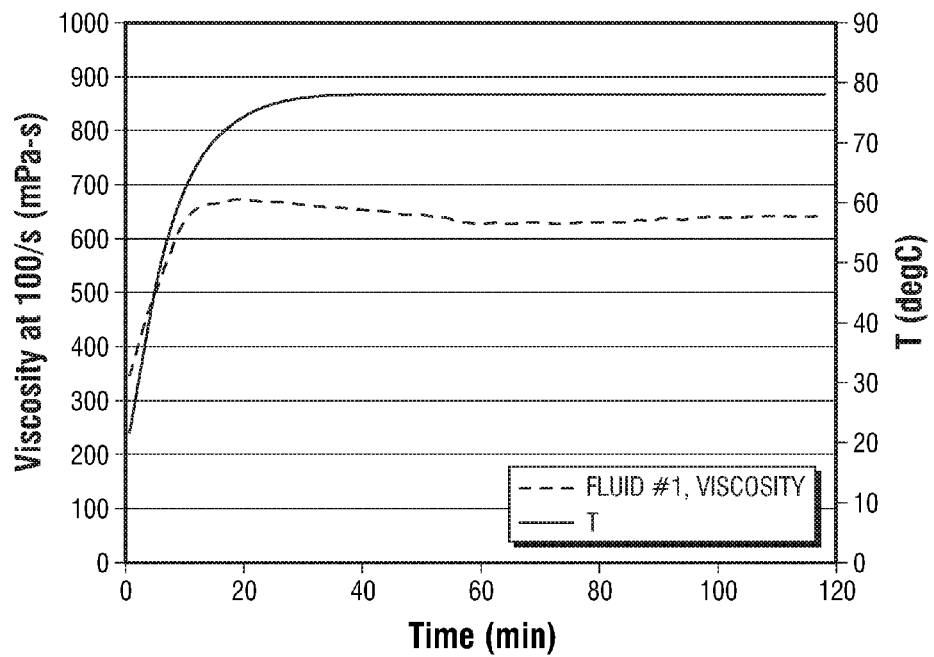
FIG. 1 shows viscosity profile as a function of time at 77 deg C. for one embodiment of gelled oil fluid.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the embodiments of the invention and should not be construed as a limitation to the scope and applicability of the invention. While the compositions of the invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

The following definitions are provided in order to aid those skilled in the art in understanding the detailed description of the invention.

The term "fracturing" refers to the process and methods of breaking down a geological formation and creating a fracture, i.e. the rock formation around a well bore, by pumping fluid at very high pressures, in order to increase production rates from a hydrocarbon reservoir. The fracturing methods otherwise use conventional techniques known in the art.

The term "surfactant" refers to a soluble or partially soluble compound that reduces the surface tension of liquids, or reduces interfacial tension between two liquids, or a liquid and a solid by congregating and orienting itself at these interfaces.

The term "viscoelastic" refers to those viscous fluids having elastic properties, i.e., the liquid at least partially returns to its original form when an applied stress is released.

The phrase "viscoelastic surfactant" or "VES" refers to that class of compounds which can form micelles (spherulitic, anisometric, lamellar, or liquid crystal) in the presence of counter ions in aqueous solutions, thereby imparting viscosity to the fluid. Anisometric micelles can be used, as their behavior in solution most closely resembles that of a polymer.

The gelled liquid hydrocarbon treatment fluids comprise a liquid hydrocarbon carrier, a ferrous salt of a phosphoric acid ester (phosphate ester), an amine, and various other optional components. The gelled liquid hydrocarbon treatment fluids are suitable for use in subterranean treatment operations, such as subterranean stimulation and sand control treatments, such as fracturing and gravel packing that may be carried out in subterranean formations. The compositions and methods of the invention also may be suitable, for example, to be used as plugging agents, well bore cleanup fluids, viscous sweep fluids, or insulating fluids to be used in associated methods.

The liquid hydrocarbon carrier is well known in the art and includes crude oil, diesel oil, various lubricating oils, kerosene, and the like. The performance of a gelled oil fluid also depends on the nature of the liquid hydrocarbon carrier used to prepare the fluid. Low-quality hydrocarbon may significantly damage the performance of the gelled oil made with it.

The gelled liquid hydrocarbon treatment fluids comprise a gelling agent that comprises a ferrous salt of a phosphoric acid ester. The term "salt" as used herein and in related applications refers to salts that can be formed directly from a phosphoric acid ester. The phosphate ester can be a mixture of PO(OR)(OR')(OR"), PO(OR)(OR')(OH), and PO(OR)(OH)$_2$, where the R, R', or R" group can be derived from the alcohol and can comprise a hydrocarbon group having from about 1 to about 30 carbon atoms that, for example, may comprise a linear or branched alkyl, alkenyl, aryl, alkylaryl, arylalkyl, cycloalkyl, alkyl ether, aryl ether, alkyl aryl ether, or a mixture thereof.

The gelling agents are made at the wellhead site by adding the phosphate ester and the ferrous (Fe2+) salt separately to the liquid hydrocarbon carrier. More specifically, the ferrous salt in aqueous solution is first mixed with an amine. The activator solution (containing ferrous salt, water, amine, etc.) is pre-mixed and then is mixed with the liquid hydrocarbon carrier and the phosphoric acid ester to form the gelled hydrocarbon. In one embodiment, the gelled hydrocarbon fluid has a concentration of more than about 100 mg/L of alkyl phosphate esters that have a molecular weight of less than about 350. In a second embodiment, the gelled hydrocarbon fluid has a concentration of more than about 250 mg/L of alkyl phosphate esters that have a molecular weight of less than about 350.

The amine may be an aliphatic or aromatic amine. The amine may be a primary amine, e.g. methylamine, ethanolamine or 2-aminoethanol, trisamine. The amine may be a secondary amine, e.g. dimethylamine, methylethanolamine or 2-(methylamino)ethanol, cyclic amines: aziridine, azetidine, pyrrolidine and piperidine. The amine may be a tertiary amine, e.g. trimethylamine, triethanolamine, dimethylethanolamine (DMEA), dibutylethanolamine, or 2-(dimethylamino)ethanol.

The gelled liquid hydrocarbon treatment fluids may further comprise an acrylamide polymer or copolymer which will increase the viscosity of the gelled liquid hydrocarbon treatment fluid.

The gelled liquid hydrocarbon treatment fluids may further comprise aliphatic alcohols.

The gelled liquid hydrocarbon treatment fluids may further comprise a surfactant or a viscoelastic surfactant (VES). The useful VES's include cationic, anionic, nonionic, mixed, zwitterionic and amphoteric surfactants, especially betaine zwitterionic viscoelastic surfactant fluid systems or amidoamine oxide viscoelastic surfactant fluid systems. Examples of suitable VES systems include those described in U.S. Pat. Nos. 5,551,516; 5,964,295; 5,979,555; 5,979,557; 6,140,277; 6,258,859 and 6,509,301, which are all hereby incorporated by reference. The system of the invention is also useful when used with several types of zwitterionic surfactants. In general, suitable zwitterionic surfactants have the formula:

RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and the O in either or both $CH_2CH_2O$ groups or chains, if present, may be located on the end towards or away from the quaternary nitrogen. One embodiment of surfactants is betaines In some embodiments, the gelled fluid further comprises a breaker selected from the group consisting of oxidative breakers, enzymes, pH modifiers, metal chelators, metal complexors, polymer hydrolysis enhancers, and micelle disturbing substances. Any breaker material suitable for reducing viscosity of the disclosed gels may be employed. Examples include calcined magnesium oxide and tetraethylenepentamine. The breaker may be solid or liquid. The breaker may be encapsulated. The breaker can include delay breaker or impregnated breaker. Examples of alkaline pH modifiers that can be used to cause emulsion destabilization include alkali metal hydroxides, oxides, phosphates, carbonates and bicarbonates; in a particular embodiment, the breaker is sodium carbonate or ammonium bicarbonate; alkaline earth oxides, phosphates, and carbonates; ammonium hydroxide, ammonium carbonate, and ammonium bicarbonate; alkali metal silicates, and base precursors such as ureas and substituted ureas, cyanates, alkylamines and certain alkanolamines, quaternary ammonium salts, ammonium salts and salts of a weak acid and a strong base, among others.

In some embodiments, it may be desired to foam or energize the gelled fluid using a gas, such as air, nitrogen, carbon dioxide, or combined. The gelled fluid therefore further comprises a foaming agent to increase the gelled oil's tendency to foam. A foaming agent is usually a surfactant that, typically present in small amounts, facilitates the formation of a foam, or enhances its stability by inhibiting the coalescence of bubbles. The foaming agent can be organopolysiloxanes such as those described in U.S. Pat. No. 4,301,868. The preferred organo functional groups in the organopolysiloxanes include alkyl and more preferably methyl. The foaming agent can also be fluorocarbon polymers/surfactants such as those described in U.S. Pat. No. 4,432,882.

The gelled liquid hydrocarbon treatment fluids may further comprise proppant materials. The selection of a proppant involves many compromises imposed by economical and practical considerations. Criteria for selecting the proppant type, size, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated, or pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, or from about 0.12 to about 0.72 kg/L, or from about 0.12 to about 0.54 kg/L. The fluid may also contain other enhancers or additives.

Any additives normally used in well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

According to the invention, the gelled liquid hydrocarbon treatment fluids may be used for carrying out a variety of subterranean treatments applications, where a gelled fluid may be used, including, but not limited to, drilling operations, fracturing treatments, and completion operations (e.g., gravel packing). In some embodiments, the treatment fluids may be used in treating a portion of a subterranean formation. In certain embodiments, the composition may be introduced into a well bore that penetrates the subterranean formation. Optionally, the treatment fluid further may comprise particulates (proppants) and other additives suitable for treating the subterranean formation. For example, the treatment fluid may be allowed to contact the subterranean formation for a period of time sufficient to reduce the viscosity of the treatment fluid. In some embodiments, the treatment fluid may be allowed to contact hydrocarbons, formations fluids, and/or subsequently injected treatment fluids, thereby reducing the viscosity of the treatment fluid. After a chosen time, the treatment fluid may be recovered through the well bore.

In certain embodiments, the treatment fluids may be used in fracturing treatments. In the fracturing embodiments, the composition may be introduced into a well bore that penetrates a subterranean formation at or above a pressure sufficient to create or enhance one or more fractures in a portion of the subterranean formation. Optionally, the treatment fluid further may comprise particulates and other additives suitable for the fracturing treatment. After a chosen time, the treatment fluid may be recovered through the well bore.

According to another embodiment, the method is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Gravel is also a natural or synthetic material, which may be identical to, or different from, proppant. Gravel packing is used for "sand" control. Sand is the name given to any particulate material from the formation, such as clays, that could be carried into production equipment. Gravel packing is a sand-control method used to prevent production of formation sand, in which, for example a steel screen is placed in the wellbore and the surrounding annulus is packed with prepared gravel of a specific size designed to prevent the passage of formation sand that could foul subterranean or surface equipment and reduce flows. The primary objective of gravel packing is to stabilize the formation while causing minimal impairment to well productivity. Sometimes gravel packing is done without a screen. High permeability formations are frequently poorly consolidated, so that sand control is needed; they may also be damaged, so that fracturing is also needed. Therefore, hydraulic fracturing treatments in which short, wide fractures are wanted are often combined in a single continuous ("frac and pack") operation with gravel packing. For simplicity, in the following we may refer to any one of hydraulic fracturing, fracturing and gravel packing in one operation (frac and pack), or gravel packing, and mean them all.

To facilitate a better understanding of the invention, the following examples of embodiments are given. In no way should the following examples be read to limit, or define, the scope of the invention.

EXAMPLES

Some tests were conducted to show the properties of the gelled oil (hydrocarbon) of the invention.

Example 1

In the first embodiment, the gelled oil fluid (labeled fluid #1) was prepared with #2 diesel, 1% alkyl phosphate ester, and a hydrocarbon gelling agent activator. The activator contained ferrous sulfate heptahydrate ($FeSO_4^- 7H_2O$), water, triethanolamine, etc. The activator was a flowable dark green liquid after it was prepared. The viscosity of the gelled oil thus formed was tested at 77 deg C. (170 deg F.) with a Fann50-type viscometer, following the API RP 39 schedule. The results are shown in FIG. 1 with the ramp peaks removed.

Depending on the application conditions such as temperature and viscosity, the range of the alkyl phosphate ester may be 0.5% to 2%, and the range of the activator may be adjusted accordingly.

The hydrocarbon gelling agent activator plays an important role in the gelled oil. Without the proper compositions or preparation methods or addition sequences, the gelled oil could be damaged, for example, showing much less viscosity under the same testing condition.

For the activator of gelled oil fluid of first embodiment consisting of ferrous sulfate heptahydrate, water, triethanolamine, etc., if the ferrous sulfate and the water (with the ferrous sulfate dissolved in the water) was not pre-mixed with the triethanolamine, but added to the diesel fluid separately (followed by the triethanolamine), the fluid could not form gel even though all individual chemicals added were the same. The ferrous sulfate heptahydrate, water, and triethanolamine were pre-mixed to form a homogeneous fluid and added as a whole to be the effective activator.

Example 2

Figure 2:
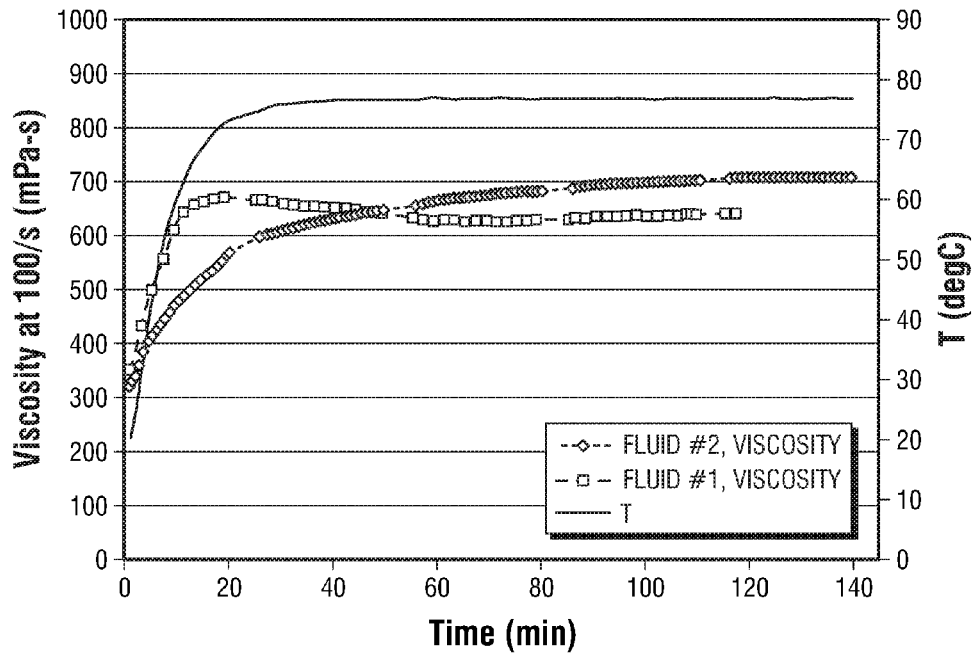
FIG. 2 shows comparison viscosity profile as a function of time at 77 deg C. for one embodiment of gelled oil fluid and a second embodiment of gelled oil.

In a second embodiment of the gelled oil fluid (labeled fluid #2), the activator consisted of ferrous sulfate heptahydrate (50% reduction when compared with the first embodiment), water (same as for fluid #1), triethanolamine (same as for fluid #1), etc. The gelled oil fluid #2 was otherwise similarly prepared and tested as fluid #1. Fluid #2 contained diesel and 1% the alkyl phosphate ester as well. The results are shown in FIG. 2 and compared with fluid #1. With the reduction of the ferrous sulfate, the viscosity of fluid #2 developed more slowly in the beginning than that of fluid #1, but fluid #2 became more viscous later.

This confirms that the activator and mixing procedures are crucial for correct viscosity behavior.

Example 3

Figure 3:
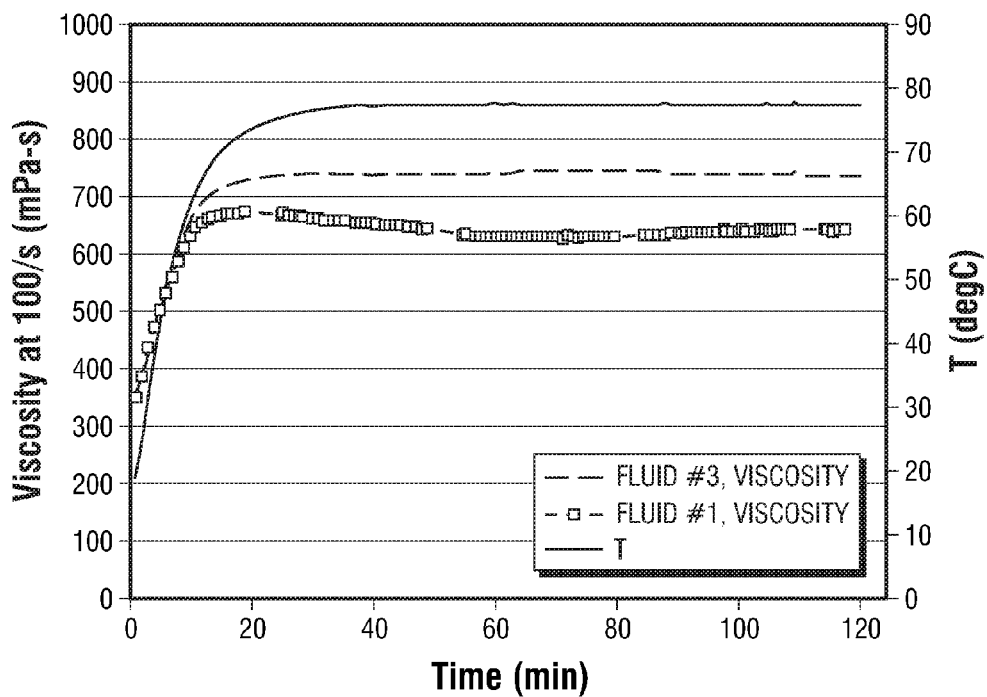
FIG. 3 shows viscosity profile as a function of time at 77 deg C. for one embodiment of gelled oil fluid and a third embodiment of gelled oil.

The addition of the acrylamide polymer or copolymer could enhance the gelled oil system. In a third embodiment, the gelled oil fluid (labeled fluid #3) was prepared and tested similarly to fluid #1, but fluid #3 also contained 0.12% acrylamide sodium acrylate copolymer (MW of about 0.5 million). The viscosity comparison between fluids #3 and #1 is shown in FIG. 3. It is obvious that the acrylamide copolymer enhanced the viscosity, for instance, the enhancement was about 15% at 2 hours. Depending on the application conditions such as temperature and viscosity, the range of the acrylamide polymer or copolymer may be about 0.02% to 0.6% or more, possibly with different MW values.

Example 4

Figure 4:
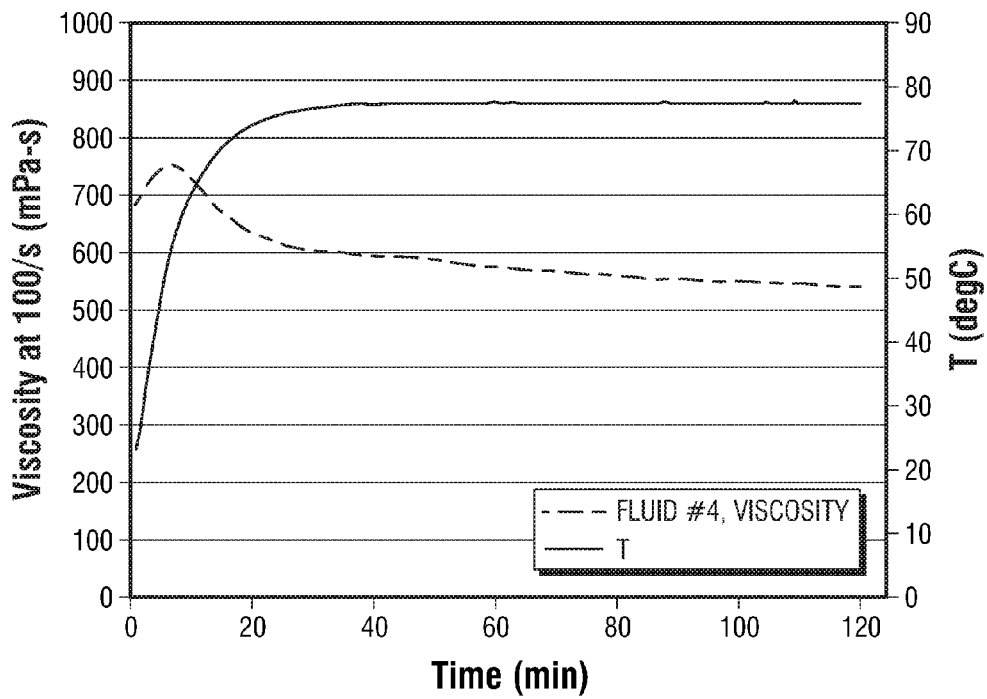
FIG. 4 shows viscosity profile as a function of time at 77 deg C. for a fourth embodiment of gelled oil fluid.

The performance of a gelled oil fluid also depends on the source of diesel used to prepare the fluid. Low-quality diesel may damage the performance of the gelled oil made with it. In this embodiment, the hydrocarbon used to prepare the gelled oil was the low-quality fracturing oil obtained from some source of crude oil. Viscoelastic surfactant (VES) such as betaine was added to the gelled oil to enhance the performance with a range of about 0% to about 1%. The VES includes a betaine surfactant BET-E-40, which was provided by Rhodia, Inc. Cranbury, N.J. BET-E-40 contains approximately 38 wt % of erucic amidopropyl dimethyl betaine as active ingredient. The gelled oil fluid (labeled fluid #4) was prepared with the low-quality fracturing oil, 1.5% phosphoric acid, ethyl, octyl, and decyl esters (a commercial product), and a hydrocarbon gelling agent activator. The activator contained ferrous sulfate heptahydrate ($FeSO_4^- 7H_2O$), water, triethanolamine, etc. About 0.15% (net) the VES betaine was also added into the gelled oil. The viscosity of the gelled oil thus formed was similarly tested at 77 deg C. (170 deg F.) with a Fann50-type viscometer. The results are shown in FIG. 4 with the ramp peaks removed. If the VES had not been added, the viscosity would have been about 60% or less compared with that of the gelled oil shown in FIG. 4.

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a portion of a subterranean formation comprising:
    a. providing a gelled liquid hydrocarbon treatment fluid, by combining a liquid hydrocarbon, a phosphoric acid ester and a pre-mixed solution comprising water, ferrous ion compound and an amine, and
    b. treating the portion of the subterranean formation with the gelled liquid hydrocarbon treatment fluid.

2. The method of claim 1, wherein the ferrous ion compound is ferrous salt.

3. The method of claim 2 wherein the ferrous salt of a phosphoric acid ester is formed from the reaction of an activator composition that comprises a source of ferrous ions in water and the amine, and a phosphoric acid ester.

4. The method of claim 1 wherein the gelled liquid hydrocarbon treatment fluid has a concentration of more than about 100 mg/liter of alkyl phosphate esters that have a molecular weight of less than about 350.

5. The method of claim 1 wherein the gelled liquid hydrocarbon treatment fluid has a concentration of more than about 250 mg/liter of alkyl phosphate esters that have a molecular weight of less than about 350.

6. The method of claim 1 wherein treating the subterranean formation involves fracturing a portion of the subterranean formation.

7. The method of claim 6 wherein the gelled liquid hydrocarbon treatment fluid further comprises proppant.

8. The method of claim 7 wherein the proppant is selected from the group consisting of nut shells, resin-coated nut shells, graded sand, resin-coated sand, sintered bauxite, particulate ceramic materials, glass beads, and particulate polymeric materials.

9. The method of claim 1 wherein treating the subterranean formation involves providing sand control to at least a portion of the subterranean formation.

10. The method of claim 9 wherein the gelled liquid hydrocarbon treatment fluid comprises gravel.

11. The method of claim 1 wherein the treating the subterranean formation involves using the gelled liquid hydrocarbon treatment fluid to provide a plugging agent to a portion of the subterranean formation or a portion of a well bore penetrating the subterranean formation.

12. The method of claim 1 wherein treating the subterranean formation involves using the gelled liquid hydrocarbon treatment fluid as a well bore cleanup fluid.

13. The method of claim 1 wherein treating the subterranean formation involves using the reduced liquid hydrocarbon treatment fluid to perform a viscous sweep of a portion of the subterranean formation or a portion of a well bore penetrating the subterranean formation.

14. The method of claim 1 wherein treating the subterranean formation involves insulating a portion of the subterranean formation, a portion of a well bore penetrating the subterranean formation, or a tubing placed in a well bore penetrating the subterranean formation.

* * * * *